June 4, 1963
A. K. SMITH
3,092,126
PORTABLE CAR PORT
Filed June 8, 1959
2 Sheets-Sheet 2
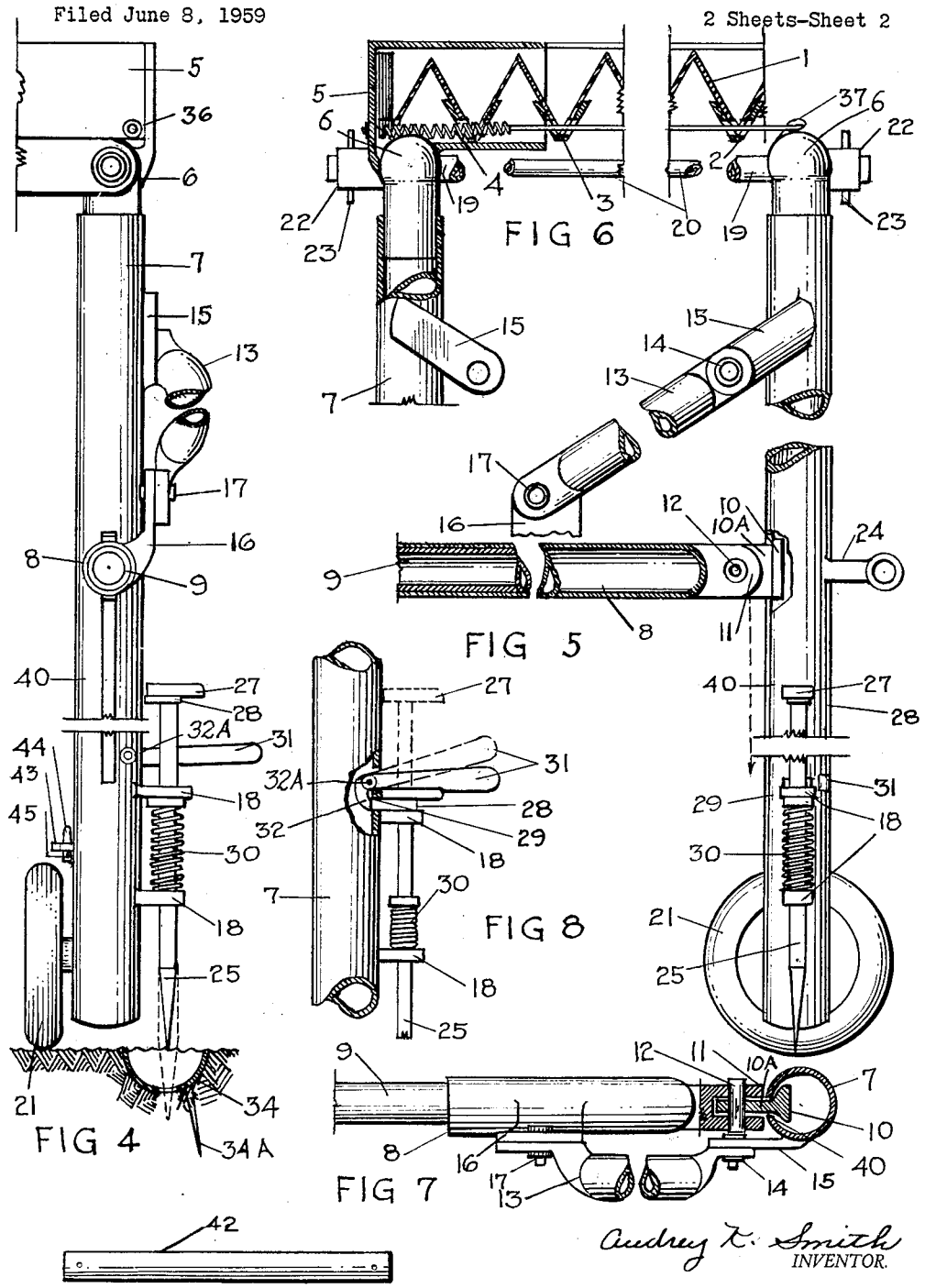

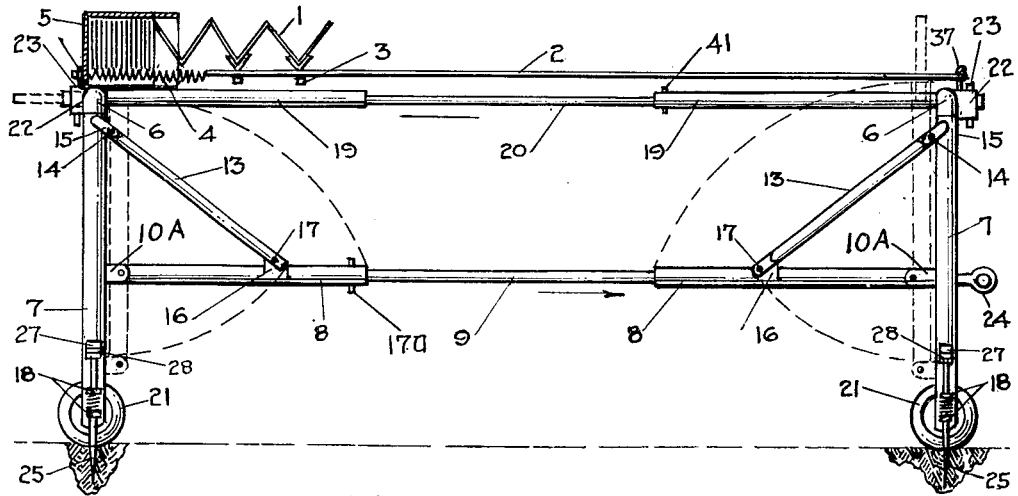
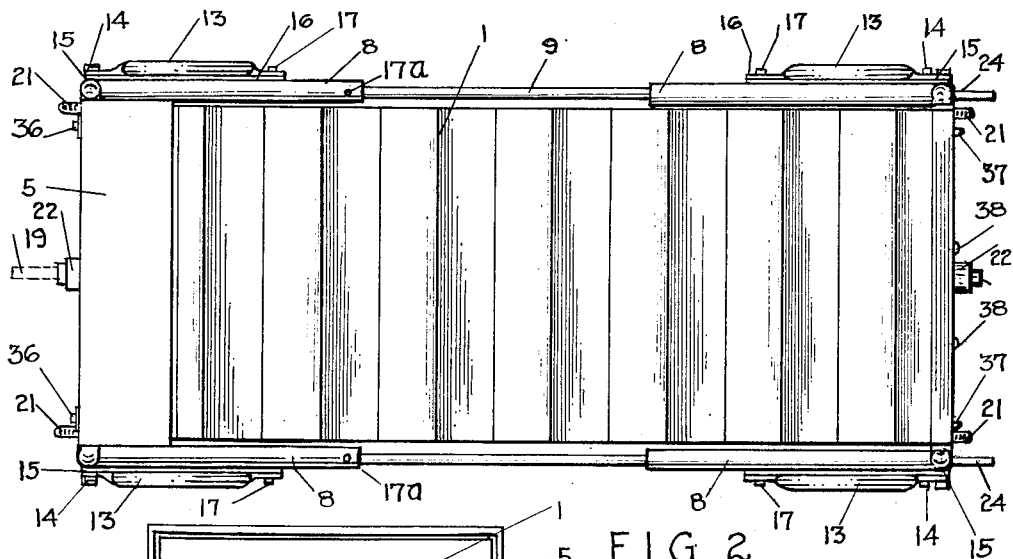
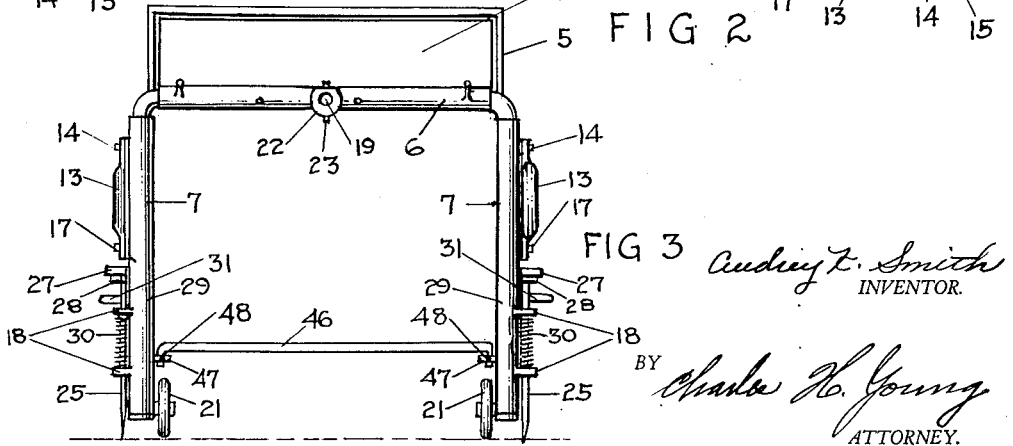

United States Patent Office 3,092,126
Patented June 4, 1963

3,092,126
PORTABLE CAR PORT
Audrey K. Smith, 2824 Raymond Ave., Stockton, Calif.
Filed June 8, 1959, Ser. No. 818,955
6 Claims. (Cl. 135—5)

This invention relates to a movable type car port or the like and particularly to those of the collapsible type.

An important object is the provision, in a device of this kind, of a collapsible frame which may be shipped in a knock-down condition, and which is so constructed that it may be quickly and easily assembled and set up in position ready for use in housing an automobile or for any other purpose requiring housing shelter.

A further object is the provision of a frame for a device of this character in which various parts are hingedly connected and in which certain parts are detachably connected so that the different portions may be easily assembled and yet held firmly in position, the invention further contemplating the provision of a novel locking means for holding the sections in rigid position when the device is set up for use.

An additional object is the provision of a device of this character which will be inexpensive to manufacture, very light in weight, easy to assemble or disassemble as the case may be, highly efficient in use, durable in service, and a general improvement in the art to which it pertains.

Referring to the accompanying drawings which form a part of this specification—

FIGURE 1 is a side elevation but with a portion of the roof and its housing shown in section;

FIGURE 2 is a top plan view with the roof in operative position;

FIGURE 3 is an end view taken from the right of FIGS. 1 and 2;

FIGURE 4 is a detail view of one of the posts or columns;

FIGURE 4A is a detail of a spacer bar used to hold the frame and sections assembled in the knock-down state for shipment or storage;

FIGURE 5 is an enlarged sectional detail of the lower part of one post and related parts;

FIGURE 6 is an enlarged sectional detail of the upper part of the post of FIG. 5 and related parts;

FIGURE 7 is an enlarged sectional detail through one of the posts and showing related parts in plan and partly in section; and FIGURE 8 is a detail view showing the ground anchor retaining and release means.

Referring to the drawings by reference characters, and turning to FIGS. 1, 2 and 3, the device comprises a novel knock-down frame to be hereinafter described, and this frame carries the roof 1, which is not, per se, a part of the present invention as claimed hereinafter.

Although the roof 1 may take other forms, it is preferably of light flexible material for covering the major portion of the length and breadth of the frame as in FIG. 2. One roof end extends through the open front of a frame-carried housing 5 and is anchored adjacent the back wall of said housing. The other roof end is adapted to be anchored to buttons or the like 38 provided by frame cross bar 6 at the opposite end of the frame. Oversized roof-provided eyelets 3, which are spaced in a length-wise direction, receive the taut frame-carried guide wire or cord 2.

The housing end of cord 2 terminates in a coil spring 4 which has its free end suitably anchored to the housing carried bolt 36; and the other cord end is secured to the hook 37 which is provided by the forward cross bar 6 of the frame. The cord 2 and the spaced roof-provided eyelets 3 facilitate the accordion-like folding of the roof 1 into the open fronted housing 5 when desired, it being noted from FIG. 6 that the eyelets 3 are large enough to ride over spring 4. Thus, the roof 1 will be protected when not in use.

As best shown in FIG. 6, housing 5 is functionally integral with one of the horizontal cross bars 6 which connect the two upstanding corner posts 7 at each end of the frame. As indicated in FIGS. 1, 3 and 6, the cross bars 6 have downturned ends which are received in sockets in the upper ends of the respective posts 7.

The frame end portions, which comprise the pairs of corner posts 7 and the related cross bars 6, are separably connected by longitudinally extending upper and lower assemblies of telescoping separate sections as indicated at 19, 20, 19 and 8, 9, 8, respectively.

FIG. 2 indicates that lower frame end-connecting assembly 8, 9, 8 is duplicated at opposite sides of the frame. On the other hand, FIGS. 1, 2 and 3 make it clear that but a single upper frame end-connecting assembly 19, 20, 19 is employed and that it is located midway between the sides of the respective frame ends 6, 7.

Sleeves 8, 8 and 19, 19 constitute the end sections of the respective lower and upper frame end connecting assemblies and these sleeves receive the ends of the intermediate bar sections 9, 20 as indicated in FIG. 1. Pins 17a extending through the lower sleeves 8 and through aligned holes in bars 9 lock these parts 8, 9 against relative longitudinal shifting.

With respect to the upper frame end connecting assembly 19, 20, 19, the rod 20 preferably extends all the way through the end sleeves 19, which latter are received in aligned seats provided by the cross bar-carried bosses 22. As shown in FIGS. 1, 2 and 6, the boss (22) provided sleeve seats extend all the way through bosses 22 so as to facilitate assembly of elements 19, 20, 19 with the respective end frames 6, 7 after the latter have been set up and connected by 8, 9, 8 and 8, 9, 8. However, as a practical proposition a throughput sleeve seat need be provided by but one boss 22.

When assembled with the respective frame ends 6, 7, the upper frame end-connecting assembly is locked in place by the boss-carried pins 23 which extend through 8, 9, and the rightmost sleeve 19 of FIG. 1 preferably has a pin 41 which extends through a hole in the adjacent portion of bar 20.

Referring back to the lower frame end connecting assemblies 8, 9, 8, it is to be noted that posts 7 are hollow and that the outer end of each sleeve 8 is bifurcated, as indicated at 11 in FIG. 7, to receive the flange 10a of a headed slide member 10 which flange extends outwardly through the vertical slot 40 in the adjacent post 7. In each instance a pivot pin 12 connects the bifurcated sleeve end 11 to the flange 10a of the related slide member 10.

Thus, as indicated in FIGS. 1, 4 and 5, each of the lower frame end section-connecting assemblies 8, 9, 8 are vertically shiftable. This is for the purpose of facilitating shipment or storage of the device in its knocked-down state as will be better understood later on.

When the car port is set up for use as in FIGS. 1, 4 and 5, a brace member 13 is provided to hold each of the lower end section-connecting assemblies 8, 9, 8 at the uppermost limit permitted by the post slots 40. The lower end of each brace member 13 is pivoted by a removable pin 17 to a lug 16 which is located adjacent the inner end of the related sleeve 8. The upper ends of the respective braces 13 are pivoted (14) to an inwardly and downwardly inclined arm 15 which is functionally integral with the upper portion of the adjacent post 7. Braces 13, of course, reinforce and thus strengthen the end-adjacent areas of the car port frame as will be readily understood.

To give the car port frame mobility, the lower portions of the corner posts 7 have outwardly projecting stub axles upon which are journalled the ground-engaging supporting wheels 21 (see FIGS. 1, 2, 3 and 4).

Although anchoring means for the mobile car port frame constitute a separate invention from that claimed herein, it is noted that if the portable car port is set up adjacent to a building the anchoring eyes 24 (FIGS. 1, 2 and 3) can be connected to similar building carried eyes.

Also vertically shiftable post-carried ground-engaging anchors 25 can be employed as indicated in FIGS. 1, 3, 4 and 5. FIGS. 1 and 3 indicate that the short lower spike ended anchor shafts 25, which have upper heads 27 for foot applied pressure, are guided for vertical movement in spaced post-carried bearings 18. A coil spring 30 is, in each instance, compressed between a fixed anchor shaft-carried shoulder 25a and the lower guide 18, yieldably resists ground penetration and also function to facilitate upward ground-disengaging movement of the anchor 25. This happens after the inwardly biased anchor shaft-carried locking latch 28 (see FIG. 8) has been disengaged from the opposed surface notch 29 in post 7.

Disengagement of latch 28 from the post notch 29 is effected, as indicated in FIG. 8, by engagement of the free end of the curved bill-form arm 32, which is fast on the rotatable post-carried shaft 32a. The operating lever 31 for shaft 32a is fast on one end thereof at one side of post 7, as best indicated in FIG. 4. When latch 28 is engaged in post notch 29, it will be clear that it will be freed therefrom by lifting of lever 31 to the dotted line position of FIG. 8. Ordinarily the thus released spring 30 will disengage anchor 25 from the ground.

A basin-like pan 34 which is anchored in the ground is indicated at 34a in connection with ground anchors 25 to help steady the carport frame and prevent transverse shifting of same when a high wind is blowing.

When the portable car port is to be knocked down for shipment or storage, the flexible roof 1 is first folded into housing 5 through its open front as suggested in FIGS. 1 and 6. Then, the cord or wire 2 is released from the cross bar-carried retainer 37 of FIG. 1 and is laid away in housing 5 or otherwise stored for future use.

Then, referring to FIG. 1, the separation of frame elements begins with the removal of pins 17 and 17a. These pins 17, 17a may, without invention, be attached to sleeve (8) carried chains (not shown), so as to be readily available for future use.

Following the removal of pins 17, 17a the lower connecting assemblies 8, 9, 8 for the frame ends 6, 7 drop to the plane of the lower ends of post slots 40 as suggested by the dotted line positions of the pivot-carrying flange 10a of slide member 10 in FIG. 1. This means that the brace members 13 (pivoting about 14 in FIG. 1) swing down to a position alongside the related post 7 (see FIGS. 1 and 6).

Referring to FIGS. 1 and 6, the next frame dismantling step is the removal of pins 23, and the following longitudinal removal of the upper end section connecting assembly 19, 20, 19 by way of one or the other of the throughput seats of the bosses 22. When pin 41 reaches a boss 22, it is removed to clear the way for complete removal of the elements 19, 20, 19.

When the upper end section-connecting assembly 19, 20, 19 has been removed, as above mentioned, the frame end sections 6, 7 and 6, 7 can be pulled in opposite directions to permit bar 20 to drop out of sleeves 19. This permits the sleeves 8, 8 to be moved upwardly to the dotted line position of FIG. 1. Cord, wire or straps can then be availed of to secure braces 13 and sleeves 8 in close folded relationship to the adjacent frame end posts 17.

After removal of the longitudinal horizontal bars 9 and 20 they can be fastened to the top of housing 5 and held in place by a strap not shown on the drawings.

The depth of the housing 5 (front to rear as seen in FIG. 1) controls the distance that the two end sections 6, 7 and 6, 7 can come together when the portable car port is disassembled for shipment or storage. This distance is maintained by the installation of the short horizontal bar 42 of FIG. 4A to engage its end adjacent apertures with the re-installed pins 23 of the bosses 22.

Near the bottom of the posts 7, as seen in FIG. 4, are upstanding lugs 44 for engagement in the end-adjacent apertures of a bar 45 which exactly corresponds to the bar 42 shown in FIG. 4A. As will be readily understood, this last mentioned duplicate of the FIG. 4A bar secures the lower portions of the two end sections, 6, 7 against separation when they have been assembled in close adjacency to one another, as aforementioned, for shipment or storage.

Referring to FIG. 3, I provide two separator bars 46 to help rigidify each frame end structure and maintain, at the lower portions of the end sections, 6, 7, the proper distance between adjacent end posts 7, 7. These separator bars 46 have the downturned ends 48 which engage in apertures in the post-carried lugs 47.

I claim:

1. In a foldable roof-incorporating carport or the like, a knockdown frame comprising end portions, upper and lower longitudinally extending frame-end portion connecting members of separable section form and with the lower ones of said members located adjacent each frame side, each of said frame end portions comprising laterally spaced posts and an upper bar connecting said posts; each of said longitudinally extending frame end portion-connecting members comprising separable telescoping end and intermediate sections, and removable means retaining the related telescoping end and intermediate sections against relative longitudinal shifting movement; a boss portion provided by each upper frame end portion bar and having a seat receiving the outer end of an end section of the upper frame end portion connecting member, each of the posts of said frame end portion having a longitudinal slot terminating adjacent its lower end, a slide member working in and retained in each of said post slots and having a projecting portion extending from the latter, means pivoting the outer portions of the end sections of said lower frame end portion connecting members to the projecting portions of the related post slot-carried slide member, brace members pivoted at one end adjacent the upper end of each frame end portion-provided post, and pivot means detachably connecting the respective lower brace member ends to an intermediate end section portion of one of the lower frame end connecting members, whereby to maintain the latter in a plane adjacent the upper end of the related post slot when the frame is set up for use, while permitting the lower frame end portion-connecting members to drop to the plane of the lower ends of said post slots when the brace members have been disconnected from said last-mentioned pivot means.

2. The structure of claim 1, and a functionally integral folded roof-receiving housing carried by the upper bar of one of said frame end portions.

3. The structure of claim 1, and a functionally integral folded roof-receiving housing carried by the upper bar of one of said frame end portions, said posts having seats in their upper ends, and said upper bars having downturned ends engageable in said seats so that the upper bar which carries said housing can be installed at either end of said frame.

4. The structure of claim 1, and after the upper frame end portion-connecting member has been removed from its boss-provided seats, the end sections of the lower frame end portion-connecting members being swingable upwardly and the related brace members downwardly to parallel adjacent posts following removal of the pivot connections between said brace members and lower end sections so as to provide compact frame end portion assemblies, means including said boss-provided seats connecting the upper portions of said assemblies, and means including lower post-provided portions connecting the lower portions of said assemblies.

5. The structure of claim 1, and inwardly projecting lugs carried by the posts of said frame end portions, and a reinforcing bar detachably connected to said lugs for reinforcing the respective frame end portions.

6. The structure of claim 1, and the upper longitudinally extending frame end portion-connecting member comprising end section sleeves and an intermediate bar section, and the boss-provided seat of at least one end section extending all the way through the related boss so that the elements of said upper frame end connecting member can be assembled therethrough, while the frame is held upright by the cooperative action of the lower frame end portion connecting members or by same and related brace members.

References Cited in the file of this patent

UNITED STATES PATENTS

| | | |
|---|---|---|
| 270,224 | Johnson et al. | Jan. 9, 1883 |
| 1,061,547 | Kennedy et al. | May 13, 1913 |
| 1,184,764 | Marsh | May 30, 1916 |
| 1,320,081 | Martin | Oct. 28, 1919 |
| 1,528,375 | Hampden | Mar. 3, 1925 |
| 1,819,490 | Weiss | Aug. 18, 1931 |
| 1,940,430 | Morterra | Dec. 19, 1933 |
| 2,321,477 | France et al. | June 8, 1943 |
| 2,592,610 | Shumaker | Apr. 15, 1952 |
| 2,627,865 | Mitchell et al. | Feb. 10, 1953 |
| 2,698,629 | Hall | Jan. 4, 1955 |